US010425334B2

(12) United States Patent
Mester et al.

(10) Patent No.: US 10,425,334 B2
(45) Date of Patent: Sep. 24, 2019

(54) WIRELESS TRAFFIC OPTIMIZATION FOR ISM RADIOS

(71) Applicant: FreeWave Technologies, Inc., Boulder, CO (US)

(72) Inventors: Timothy G. Mester, Longmont, CO (US); Patrick I. Lazar, San Jose, CA (US)

(73) Assignee: FreeWave Technologies, Inc., Boulder, CO (US)

( * ) Notice: Subject to any disclaimer, the term of this patent is extended or adjusted under 35 U.S.C. 154(b) by 208 days.

(21) Appl. No.: 15/359,947

(22) Filed: Nov. 23, 2016

(65) Prior Publication Data

US 2018/0145910 A1    May 24, 2018

(51) Int. Cl.
*H04L 12/743*    (2013.01)
*H04W 72/04*    (2009.01)
*H04L 29/06*    (2006.01)
*H04W 88/08*    (2009.01)

(52) U.S. Cl.
CPC ..........  *H04L 45/7453* (2013.01); *H04L 69/04* (2013.01); *H04W 72/0453* (2013.01); *H04W 88/085* (2013.01)

(58) Field of Classification Search
CPC ....... G06F 3/0641; H03M 7/30; H04L 9/0643
See application file for complete search history.

(56) References Cited

U.S. PATENT DOCUMENTS

| 7,718,941 | B2 | 5/2010 | Austin et al. |
| 9,141,554 | B1* | 9/2015 | Candelaria .......... G06F 12/0864 |
| 2009/0021447 | A1 | 1/2009 | Austin et al. |
| 2014/0168012 | A1 | 6/2014 | Mankowski et al. |
| 2014/0317479 | A1* | 10/2014 | Candelaria .......... G06F 11/1004 714/807 |
| 2015/0223195 | A1 | 8/2015 | Karttaavi et al. |
| 2016/0036117 | A1 | 2/2016 | Whitley et al. |
| 2016/0056525 | A1 | 2/2016 | Hansryd et al. |
| 2016/0079651 | A1 | 3/2016 | Xu et al. |
| 2016/0218427 | A1 | 7/2016 | Derneryd |

* cited by examiner

*Primary Examiner* — Ayaz R Sheikh
*Assistant Examiner* — Debebe A Asefa

(57) ABSTRACT

Embodiments include radio transmitters, receivers and methods of operation for enhanced bandwidth utilization. The transmitter hashes received data blocks to produce indices associated with the received data blocks. The data blocks and associated indices are stored in memory and transmitted. If the received data blocks have previously been stored, the indices are transmitted instead of the data blocks. The receiver stores the received data blocks and associated indices in memory, and outputs the received data blocks. When the receiver receives indices instead of data blocks, it accesses the memory to look up and retrieve the associated data blocks, and outputs the retrieved data blocks.

19 Claims, 3 Drawing Sheets

WIRELESS TRAFFIC OPTIMIZATION FOR ISM RADIOS

FIELD OF THE INVENTION

The invention relates generally to methods and systems for optimizing bandwidth utilization in wireless communication systems.

BACKGROUND

There is a continuing need for methods and systems to optimize the utilization of available bandwidth in wireless communication systems such as those that operate in the industrial, Scientific and Medical (ISM) radio bands. Advantages of enhanced bandwidth utilization can include the ability to send information or other data with greater accuracy (i.e., less susceptibility to corruption), the ability to send greater amounts of data using a given amount of bandwidth, and the ability to utilize a lesser amount of bandwidth for a given amount of data, thereby freeing up bandwidth for other data. Methods and systems that offer these advantages, and that are efficient to implement, are especially desirable.

SUMMARY

Embodiments include radio transmitters, receivers and methods of operation for enhanced bandwidth utilization. A method for operating a radio transmitter in accordance with embodiments comprises: receiving data blocks; hashing, the received data blocks to produce indices associated with the received data blocks comparing the received data blocks and/or associated indices to stored data blocks and/or stored indices stored in memory to determine whether the received data blocks are stored in the memory; storing in the memory the received data blocks and associated indices if the comparisons determine that the received data blocks and associated indices are not stored in the memory; transmitting by radio signals the received data blocks and associated indices if the comparisons determine that the received data blocks are not stored in the memory; and transmitting by radio signals the indices associated with the received data blocks instead of the received data blocks if the comparisons determine that the received data blocks are stored in the memory.

In other embodiments of the method for operating a radio transmitter, comparing the received data blocks and/or associated indices includes determining whether the received data blocks meet similarity criteria to identified stored data blocks in the memory. In such embodiments, the method can further include: generating delta data representative of differences between the received data blocks and the identified stored data blocks; and transmitting by radio signals the delta data and indices associated with the identified stored data blocks, instead of the received data blocks, if the comparisons determine that the received data blocks meet the similarity criteria to the identified stored data blocks.

A method fur operating a radio receiver in accordance with embodiments comprises: receiving radio signals representative of (1) data blocks and associated indices, and (2) indices representative of data blocks instead of the associated data blocks; storing the received data blocks and associated indices in memory when the received data blocks and associated indices are received; outputting the received data blocks when the received data blocks and associated indices are received; comparing the received indices to the indices stored in the memory, and retrieving the associated data blocks from the memory, when the received indices representative of data blocks instead of the associated data blocks are received; and outputting the retrieved data blocks when the indices representative of data blocks instead of the associated data blocks are received.

In other embodiments of the method for operating a radio receiver, receiving radio signals further includes receiving signals representative of (3) indices representative of associated data blocks and associated delta data instead of the associated data blocks. In such embodiments, the method can further include: comparing the received indices to the indices stored in the memory, and retrieving the associated data blocks from the memory, when the received indices and associated delta data instead of the associated data blocks are received; reconstructing the data blocks using the retrieved data blocks and associated delta data; and outputting the reconstructed data blocks when the indices and associated delta data instead of the associated data blocks are received.

DESCRIPTION OF THE INVENTION

Figure 1:
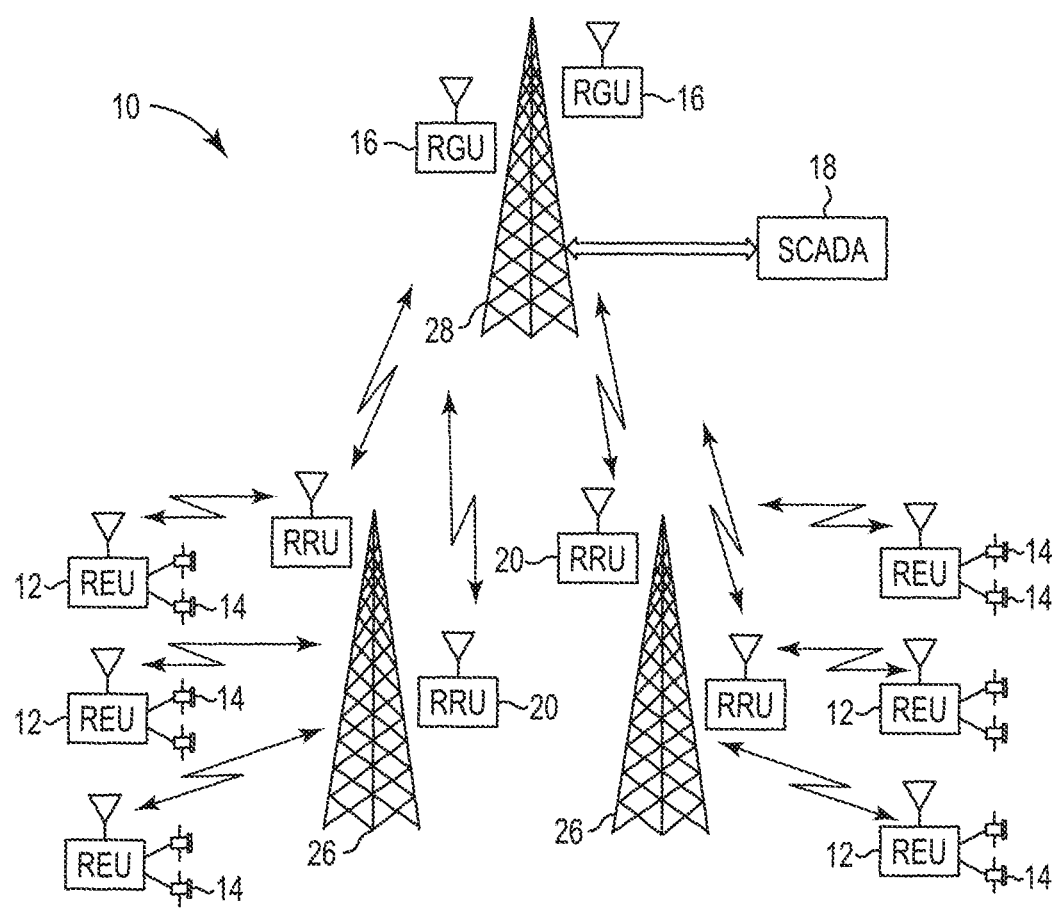
FIG. 1 is a diagrammatic illustration of a wireless communication system including radios in accordance with embodiments of the invention.

FIG, 1 is a diagrammatic illustration of a wireless communication system 10 that includes bandwidth-optimized radios in accordance with embodiments of the invention. As shown, system 10 includes a plurality of transceivers or radios such as radio endpoint units (REUs) 12, each of which is connected to one or more sensors 14. Data or other information collected by sensors 14 is wirelessly transmitted by the REUs 12 to one or more remote radios such as radio gateway units (RGUs) 16, which can be connected by conventional communication networks (e.g., wired or wireless networks) to a system 18 such as supervisory control and data acquisition system (SCADA) that uses the collected data (e.g., for process control or information management). In the illustrated embodiment, the REUs 12 wirelessly communicate with the RGUs 16 through radios such as radio repeater units (RRUs) 20. Other embodiments, e.g., where the REUs 12 and RGUs 16 are within range of each other, do not include RRUs 20. A plurality of radios such as RRUs 20 can be co-located at a location or site, such as on a common antenna tower. In the illustrated embodiment, for example, each of antenna towers 26 includes two RRUs 20. Similarly, a plurality of co-located RGUs 16 are shown mounted to antenna tower 28. The sites of antenna towers 26 and 28 are typically remotely located with respect to one another.

In embodiments, REUs 12, RGUs 16 and RRUs 20 can be configured as time division multiple access (TDMA) or carrier sense multiple access (CSMA) radios that operate in the industrial, scientific and medical (ISM) carrier frequency bands. By way of example, the radios can operate at carrier frequencies such as 100 MHz-6 GHz, and have channel bandwidths such as 6.25 KHz-10 MHz. Other embodiments of the invention operate at other frequency bands, other channel bandwidths and/or at multiple carrier frequencies, and can be configured to use other channel access methods and/or other physical layers and hardware structures. One or more suitable modulation schemes such as, for example, FSK (frequency shift keying) QPSK (quadrature phase shift keying), 16 QAM (quadrature amplitude modulation) and 64 QAM, and multicarrier schemes such OFDM (orthogonal frequency division multiplexing) and OFDMA (orthogonal frequency division multiple access) can be used. Applications of REUs 12, RGUs 16 and RRUs 20 include, for example, oil and gas field management, water and wastewater management, location tracking and machine-to-machine (M2M) applications. Embodiments of the invention are particularly useful, for example, in applications involving the transmission of relatively slowly changing data.

Figure 2:
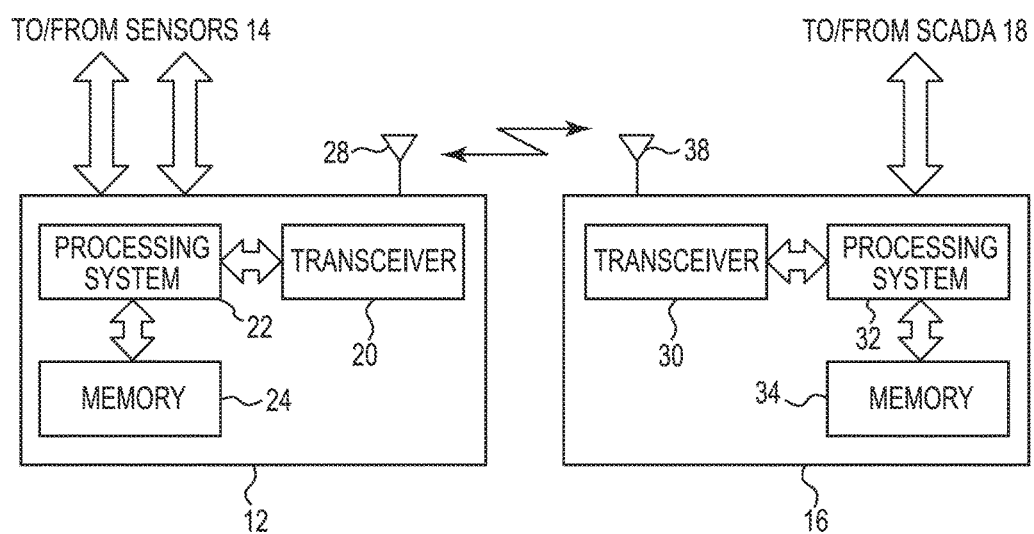
FIG. 2 is a block diagram of several radios shown in FIG. 1.

FIG. 2 is a diagrammatic illustration of an exemplary REU 12 and RGU 16 in accordance with embodiments. As shown, REU 12 includes a transceiver 20, processing system 22 and memory 24. The REU 12 is connected to receive blocks of data from, and optionally to send blocks of data to, sensors 14. In embodiments, the connections between REU 12 and sensors 14 are wired connections, although wireless connections can also be used. The blocks of data received by REU 12 can take any of a wide variety of forms and lengths, and are serial packets or Ethernet packets in embodiments. For example, different sensors 14 are configured to send data in different lengths of packets. By way of example, the data blocks have lengths between about fifty-three bytes and one hundred and twenty-six bytes in embodiments. Processing system 22 includes conventional hardware such as programmed processors, application specific integrated circuits (ASICS) and/or discrete circuit components. Memory 24 can also be conventional. The amount of memory 24 included in the REU 12 may depend on a number of factors such as cost, the speed of processing system 22 and the desired speed by which the data blocks are transmitted by the REU 12 following their receipt by the REU. In embodiments, memory 24 is used in a first-in-first-out (FIFO) configuration, although other configurations can be used. In connection with memory 24, and operating using methods described below, processing system 22 processes the received data blocks to convert the data blocks into compressed bandwidth- or other transmission-optimized formats. As described in greater detail below, the transmission-optimized data block formats can include one or more of the original data blocks, indices associated with the data blocks, and associated delta data representative of differences between the data blocks and other data blocks. Transceiver 20, which can be conventional in design and have operating specifications such as those described above, modulates the processed data blocks and associated information, and couples the transmission-optimized data block formats to antenna 26 for transmission to RGU 16 as RF radio signals.

RGU 16 includes transceiver 30, processing system 32, memory 34 and antenna 38 that can be similar in structure to those of REU 12 and described above. Antenna 38 receives the radio signals from REU 12 and couples those signals to transceiver 30. Transceiver 30 demodulates the radio signals to retrieve the received transmission-optimized data block formats, and couples the data blocks and associated information to the processing system 32. Processing system 32, in connection with memory 34, processes the transmission-optimized data blocks, including the original data blocks, associated indices and delta data, to convert the data back to the blocks of data corresponding to the data blocks in the original format as received by the REU 12. The data blocks recovered by RGU 16 in this manner are then coupled to the network such as SCADA 18, typically by a wired connection. In other embodiments, RGU 16 couples the recovered data blocks to other networks by wireless transmission protocols.

Figure 3:
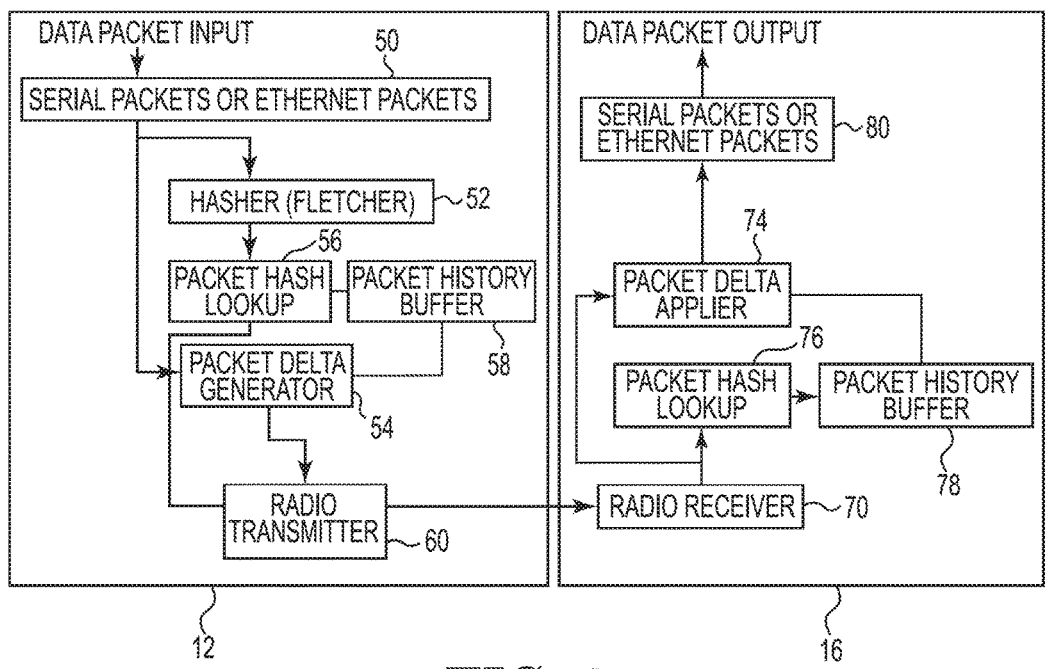
FIG. 3 is a diagrammatic hybrid structure/process illustration of bandwidth optimization functionality in accordance with embodiments of the invention that can be used by radios such as those shown in FIG. 2.

FIG. 3 is a hybrid structure/process block diagram illustrating the functionality of REU 12 and RGU 16 that provide the transmission-optimized data communications in accordance with embodiments. Although described as a one-way communication path in FIG. 3, other embodiments are configured to provide transmission-optimized bi-directional wireless data communications using the systems and methods described herein. The processing step functionality can, for example, be performed by the processing systems 22 and 32, the data storage functions can be provided by the memory 24 and 34, the radio transmitter and receiver functions can be provided by the transceivers 20 and 30.

As shown, the data blocks 50 inputted to or received by the REU 12 are provided to a hasher 52 and packet delta generator 54. Hasher 52 hashes the received data blocks 50 to generate indices associated with the data blocks. Any suitable hashing function can be used by the hasher 52 to map the data blocks 50 to the indices. In embodiments, hasher 52 uses a Fletcher checksum as the hash function. The indices produced by the hasher 52 are representative of the associated data blocks 50, and are preferably shorter in length or size than the data blocks. Following the examples above, fifty byte data blocks hashed by a Fletcher checksum function can be mapped to four byte indices.

As shown, REU 12 uses a packet history buffer 58 to store certain received data blocks and the indices associated with those data blocks. Packet hash lookup 56 performs a lookup function by comparing the indices generated by the hasher 52 to indices that have previously been stored in the packet history buffer 58. The purpose of the lookup is to determine whether a data block that is the same as the received data block that is being processed is stored in the packet history buffer 58 (e.g., was previously stored). Using the indices during this lookup operation can enhance the speed of the lookup operation since indices are shorter in length than the data blocks in embodiments. In other embodiments, the lookup operation performed by packet lookup 56 can be done by comparing the received data blocks to the stored data blocks in the packet history buffer 58. If the received data blocks and associated indices are not found during the packet hash lookup 56, the data blocks and the associated indices are stored in the packet history buffer 58.

In embodiments, the data blocks stored in the packet history buffer 58 can be sorted by packet size, or otherwise include information such as an index characterizing the sizes of the packets. As described below, the size-sorted packet index or information can be used to enhance the speed of certain operations performed in accordance with embodiments of the invention. A last-used index sorting packet entries by the time they were used (or stored if not currently in the index) can be included in embodiments. Other embodiments include time stamps associated with the packets in the buffer 58, and the timestamps are updated to reflect events associated with the packets (e.g., storage or use). The packet history buffer 58 is limited in size, providing a practical limit to the number of data blocks, indices and/or associated data that is stored in embodiments. In embodiments of these types, the last-used entry can be replaced by a new entry when the packet history buffer 58 is full.

When the packet hash lookup 56 identifies stored data blocks in the packet history buffer 58 that are the same as the received data blocks, the indices associated with the stored data blocks are retrieved from the packet history buffer. In these situations the indices associated with the stored data blocks, instead of the data blocks themselves, are transmitted by the radio transmitter 60 of the REU 12. Because the lengths of the indices are typically shorter than those of the associated data blocks, the bandwidth used by the REU 12 can be optimized by the transmission of the indices instead of the associated data blocks. As described below, the RGU 16 is configured to determine and retrieve the associated data blocks based on its receipt of the indices.

In embodiments, radio transmitter 60 transmits the received data blocks and the indices associated with the received data blocks when the packet hash lookup 56 does not identify stored data blocks in the packet history butter 58 that are the same as the received data blocks. As described herein, the RGU 16 is configured to use the received data blocks and associated indices in a manner that enables REU 12 to optimize its bandwidth.

In embodiments such as that shown in FIG. 3, before transmitting the received data blocks and associated indices when the packet hash lookup 56 does not identify stored data blocks that are the same as the received data blocks, packet delta generator 54 determines for each such received data block whether it is a close match to a stored data block. When the packet delta generator 54 identifies a stored data block that closely matches the received data block (e.g., meets certain similarity criteria), the packet delta generator 54 causes radio transmitter 60 transmit the index of the stored and close data block, and delta data characterizing the differences between the received data block and the stored and close data block, instead of the received data block and associated index. In embodiments, the packet delta generator 54 uses, as a similarity criteria, whether a compressed version of the delta data is shorter than the received data block and is thereby capable of bandwidth-optimized transmission with respect to the received data block.

An exemplary algorithm that can be used by packet delta generator 54 in connection with the similarity criteria determination for each received data block is as follows. The length of the received data block is compared to the length of each stored data block in the packet history buffer 58. The stored size-sorted packet index or other information characterizing the sizes of the stored data blocks can be used to enhance the efficiency of this comparison by first comparing the received data block to stored data blocks having the same length. If the length of the received data block does not match the length of any of the stored data blocks, the received data block is determined not to meet the similarity criteria, and the received data block and associated index are transmitted by the radio transmitter 60. In embodiments, REU 12 limits the length of time spent looking for a match (e.g., by limiting the number of entries in the packet history buffer 58 that are checked). Latency can be reduced by this limited comparison approach if the number of different packets in the packet history buffer 58 having the same length is large.

If the length of the received data block matches one or more of the stored data blocks, the packet delta generator 54 performs an XOR (exclusive OR) operation between the received data block and each such stored data block to generate the delta data characteristic of the differences between the received data block and each such stored data block. The XOR operation can be performed at the byte level of the data blocks. Each generated delta data is then compressed using a suitable compression algorithm such as run length encoding (RLE). The shortest such compressed delta data is then identified (e.g., by comparing the lengths of the compressed delta data). The length of the compressed delta data having the shortest length (or the length of a select one such compressed delta data if more than one compressed delta data have the same and shortest lengths) is then compared to the length of the received data block.

When the length of the shortest compressed delta data is less than the length of the received data block, the compressed delta data and the index of the associated stored data block from which the delta data was generated are transmitted by the radio transmitter 60 instead of the data block and associated index to obtain bandwidth optimization. When the length of the shortest compressed delta data is greater than or equal to the length of the received data block (i.e., when the closest stored data block is insufficiently close to enable bandwidth optimized transmission), the received data block and the index associated with the received data block are transmitted by the radio transmitter 60.

RGU 16 includes receiver 70 that receives from REU 12 (1) the data that are transmitted with associated indices, (2) indices instead of the data blocks, and in embodiments (3) compressed delta data and associated indices instead of the data blocks. In response to the receipt of this information, RGU 16 retrieves and outputs the data blocks corresponding to those inputted to the REU 12. As shown, RGU 16 uses a packet history buffer 78 to store certain received data blocks and the indices associated with those data blocks. In response to the receipt of data blocks that are transmitted with associated indices, RGU 16 stores both the data blocks and the associated indices in the packet history buffer 78, and outputs those data blocks as shown at 80 in FIG. 3. In response to the receipt of indices instead of data blocks, packet hash lookup 76 performs a lookup function by comparing the received indices to the indices that have previously been stored in the packet history buffer 78. The data blocks associated with the indices are identified and retrieved by this lookup, and the data blocks are then outputted as shown at 80.

In embodiments that receive compressed delta data and associated indices, RGU 16 reconstructs the data blocks using the delta data and associated indices. In embodiments, packet hash lookup 76 uses the indices in the manner described above to perform a lookup function to identify and retrieve the stored data blocks associated with the indices. Packet delta applier 74 decompresses the associated delta data, and reconstructs the data blocks using the decompressed delta data and the retrieved data blocks associated with the indices. Following the example used above, packet delta applier 74 can perform this operation in connection with each compressed delta data and index by decompressing the compressed delta data by run length decoding the compressed delta data, and then performing an XOR operation between the decompressed delta data and the associated retrieved data block. The reconstructed data blocks are then outputted as shown at 80.

Systems and methods in accordance with embodiments of the invention offer important advantages. They can reduce the need to send large packets when the packets have been previously sent, thereby reducing the need for larger bandwidth. This capability can be very important in IOT (internet of things) networks where sensor data is sent continuously whether the content of the data changes or not, such as SCADA data and telemetry data. The possibility of packet data being corrupted over the wireless network, and the concurrent need to retransmit the corrupted packet, is reduced as a result of the much smaller sizes of the packets (e.g., four—sixteen bytes instead of 50 bytes). The system and method can also be efficiently implemented using hardware and/or software approaches such as those described above.

Although the invention has been described with reference to preferred embodiments, those of skill in the art will recognize that changes can be made in form and detail without departing from the spirit and scope of the invention.

What is claimed is:

1. A method for operating a radio transmitter, comprising:
   receiving data blocks;
   hashing the received data blocks to produce indices associated with the received data blocks;
   comparing the received data blocks and/or associated indices to stored data blocks and/or stored indices stored in memory to determine whether the received data blocks are stored in the memory;
   storing in the memory the received data blocks and associated indices if the comparisons determine that the received data blocks and associated indices are not stored in the memory;
   transmitting by wireless radio signals the received data blocks and associated indices if the comparisons determine that the received data blocks are not stored in the memory; and
   transmitting by wireless radio signals the indices associated with the received data blocks instead of the received data blocks if the comparisons determine that the received data blocks are stored in the memory.

2. The method of claim 1 wherein:
   comparing the received data blocks and/or associated indices includes determining whether the received data blocks meet similarity criteria to identified stored data blocks in the memory; and
   the method further includes:
      generating delta data representative of differences between the received data blocks and the identified stored data blocks; and
      transmitting by wireless radio signals the delta data and indices associated with the identified stored data blocks, instead of the received data blocks, if the comparisons determine that the received data blocks meet the similarity criteria to the identified stored data blocks.

3. The method of claim 2 wherein determining whether the received data blocks meet similarity criteria includes determining whether the delta data can be transmitted with lower bandwidth than the associated received data blocks.

4. The method of claim 3 wherein determining whether the delta data can be transmitted with lower bandwidth than the associated received data blocks includes comparing the lengths of the delta data and the associated received data blocks.

5. The method of claim 4 wherein:
   generating delta data includes compressing the delta data; and
   comparing lengths of the delta data and the associated received data blocks includes comparing lengths of the compressed delta data and the associated received data blocks; and
   transmitting the delta data and indices associated with the identified stored data blocks includes transmitting the compressed delta data.

6. The method of claim 2 wherein determining whether the received data blocks meet similarity criteria to identified stored data blocks in the memory includes comparing the received data blocks to stored data blocks having the same lengths as the received data blocks.

7. The method of claim 6 and further including time limiting the step of comparing the received data blocks to stored data blocks.

8. The method of claim 2 and further including time limiting the step of determining whether the received data blocks meet similarity criteria to identified stored data blocks in the memory.

9. The method of claim 2 wherein receiving the data blocks includes receiving the data blocks by a wired interface.

10. The method of claim 2 and further including a method for operating a radio receiver, comprising:
    receiving wireless radio signals representative of (1) data blocks and associated indices, (2) indices representative of data blocks instead of the associated data blocks, and (3) indices representative of associated data blocks and associated delta data instead of the associated data blocks;
    storing the received data blocks and associated indices in memory when the received data blocks and associated indices are received;
    outputting the received data blocks when the received data blocks and associated indices are received;
    comparing the received indices to the indices stored in the memory, and retrieving the associated data blocks from the memory, when the received indices representative of data blocks instead of the associated data blocks are received;
    outputting the retrieved data blocks when the indices representative of data blocks instead of the associated data blocks are received;
    comparing the received indices to the indices stored in the memory, and retrieving the associated data blocks from the memory, when the received indices and associated delta data instead of the associated data blocks are received;
    reconstructing the data blocks using the retrieved data blocks and associated delta data when the indices and associated delta data instead of the associated data blocks are received; and
    outputting the reconstructed data blocks when the indices and associated delta data instead of the associated data blocks are received.

11. The method of claim 10 wherein receiving the data blocks includes receiving the data blocks by a wired interface.

12. The method of claim 1 wherein receiving data blocks includes receiving data blocks by a wired interface.

13. The method of claim 1 and further including a method for operating a radio receiver, comprising:
    receiving wireless radio signals representative of (1) data blocks and associated indices, and (2) indices representative of data blocks instead of the associated data blocks;
    storing the received data blocks and associated indices in memory when the received data blocks and associated indices are received;
    outputting the received data blocks when the received data blocks and associated indices are received;
    comparing the received indices to the indices stored in the memory, and retrieving the associated data blocks from the memory, when the received indices representative of data blocks instead of the associated data blocks are received; and
    outputting the retrieved data blocks when the indices representative of data blocks instead of the associated data blocks are received.

14. The method of claim 13 wherein receiving data blocks includes receiving data blocks by a wired interface.

15. A method for operating a radio receiver, comprising:
receiving wireless radio signals representative of (1) data blocks and associated indices, and (2) indices representative of data blocks instead of the associated data blocks;
storing the received data blocks and associated indices in memory when the received data blocks and associated indices are received;
outputting the received data blocks when the received data blocks and associated indices are received;
comparing the received indices to the indices stored in the memory, and retrieving the associated data blocks from the memory, when the received indices representative of data blocks instead of the associated data blocks are received; and
outputting the retrieved data blocks when the indices representative of data blocks instead of the associated data blocks are received.

16. The method of claim 15 wherein outputting the data blocks include outputting the data blocks by a wired interface.

17. The method of claim 15 wherein:
receiving wireless radio signals further includes receiving signals representative of (3) indices representative of associated data blocks and associated delta data instead of the associated data blocks; and
the method further includes:
comparing the received indices to the indices stored in the memory, and retrieving the associated data blocks from the memory, when the received indices and associated delta data instead of the associated data blocks are received;
reconstructing the data blocks using the retrieved data blocks and associated delta data; and
outputting the reconstructed data blocks when the indices and associated delta data instead of the associated data blocks are received.

18. The method of claim 17 wherein:
receiving the delta data includes receiving compressed delta data;
the method further includes decompressing the delta data.

19. The method of claim 17 wherein outputting the data blocks include outputting the data blocks by a wired interface.

* * * * *